United States Patent [19]

Drain

[11] 4,441,135

[45] Apr. 3, 1984

[54] THREE-PHASE POWER TRANSMISSION LINE PHASE-TO-GROUND FAULT RESPONDER

[75] Inventor: Robert E. Drain, Butte, Mont.

[73] Assignee: The Montana Power Company, Butte, Mont.

[21] Appl. No.: 405,926

[22] Filed: Aug. 6, 1982

[51] Int. Cl.³ .............................................. H02H 3/16
[52] U.S. Cl. .......................................... 361/47; 361/92
[58] Field of Search ...................... 361/42, 47, 48, 79, 361/92.

[56] References Cited

U.S. PATENT DOCUMENTS 1,749,531  3/1930  Goldsborough ................. 361/47 X
1,937,166  11/1933  Pittman ............................. 361/47
3,209,204  9/1965  Rockefeller, Jr. .................... 361/47

FOREIGN PATENT DOCUMENTS 5267306  11/1979  Japan .................................... 361/42
54-73249  12/1979  Japan .................................... 361/42

*Primary Examiner*—Harry E. Moose, Jr.
*Attorney, Agent, or Firm*—Christensen, O'Connor, Johnson & Kindness

[57] ABSTRACT

A three-phase power transmission line phase-to-ground fault responder wherein voltage coils of respective responder relays are energized by respective phase-related voltages and wherein current coils of such relays are serially connected across the composite voltage source comprising the three serially composite voltage source comprising the respective phase-related voltages applied in series. In one embodiment the phase-related voltages are proportional to the transmission line phase voltage itself whereas in a second embodiment, less sensitive to location of fault in relation to the instrument takeoff voltage location, the phase-related voltage is the vector sum of voltages of the other two phases.

11 Claims, 7 Drawing Figures

Fig. 2
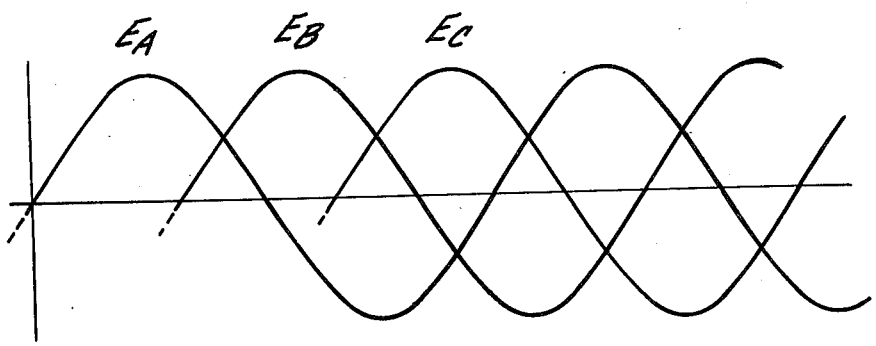
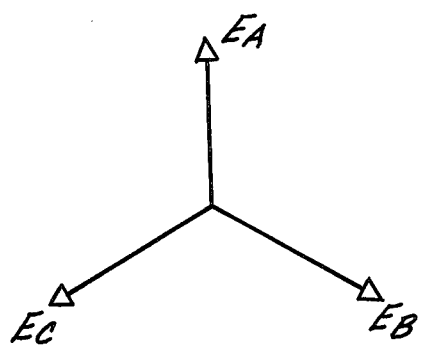
Fig. 3.
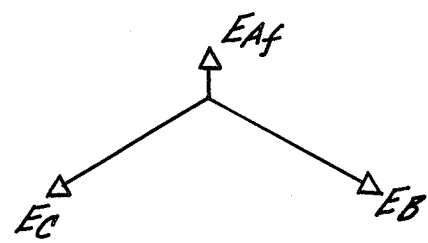
Fig. 4.
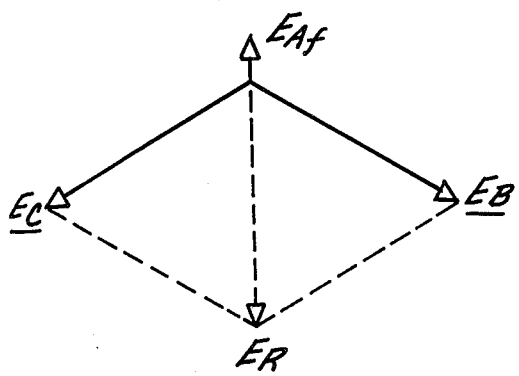
Fig. 6.
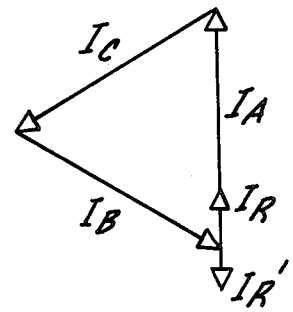
Fig. 7.

THREE-PHASE POWER TRANSMISSION LINE PHASE-TO-GROUND FAULT RESPONDER

BACKGROUND OF THE INVENTION

This invention relates to an improved apparatus for identifying the faulted phase during a phase-to-ground fault in high-voltage, three-phase, long-distance transmission lines such as for annunciating or recording the occurrence of such a fault or for single-pole trip and reclose protective relaying. The invention is herein illustratively described in presently preferred forms; however, it will be recognized that certain modifications and changes with respect to details of implementation may be made without departing from the essential features involved.

While there have been systems intended and operational to detect, annunciate or otherwise respond to line-to-ground faults in power transmission lines, most, if not all, of the phase identifying techniques have been unduly complex and expensive. Furthermore, such former systems were not altogether reliable or secure against false tripping or in consistently responding to faults. Such systems were based primarily upon abnormal line current flow in a transmission phase line attending a phase-to-ground fault.

An important object of the present invention is to provide a simplified, relatively low cost and reliable apparatus for the intended purpose. A related object is to provide such a system in which false tripping will be less likely than with prior systems and in which tripping or response to a phase-to-ground fault will occur substantially independently of concurrent load transients affecting the system. Also, the present invention will respond correctly to phase-ground faults occurring simultaneously on two of the three phase lines, whereas previous systems would not.

A specific object hereof is to devise such a system wherein specific location of the fault in terms of distance from the point of detection or installation of the responder apparatus is not critical to reliability of the response of the apparatus to a phase-to-ground fault.

BRIEF DESCRIPTION OF THE INVENTION

Responder systems provided by the present invention, referenced to power transmission line phase voltage drops that accompany line-to-ground faults, are found to be more consistently reliable than prior systems based as they were on abnormal phase current flow. It appears that power line current changes that accompanying faults can sometimes also be caused by other system conditions such as load transients. Also, it appears that load transients may occur concurrently with a line-to-ground fault with such phasing and magnitude as to offset and thereby substantially mask the phase current abnormality otherwise relied upon to detect the occurrence of the fault itself.

In accordance with this invention, the phase voltages, proportionately reduced to instrument voltage level by transformer action, are added in series and their vector sum applied to a series of current coils in the responder phase relays. Voltage coils of the respective relays are individually energized by the phase-related power transmission line voltages likewise proportionately reduced in amplitude to instrument level. In one embodiment, these phase-related voltages are proportional to line-to-ground voltages in the system. In another embodiment, one more fully independent of line distance from the instrument voltage takeoff location to the location of the phase-to-ground fault, the vector sum of voltages proportional to the other two phase voltages of the transmission line energizes the voltage coil of the phase-related relay involved. In each embodiment a phase-to-ground fault, dropping phase voltage to a low value, results in a set voltage applied across the series-connected current coils of the relays.

In the first-mentioned embodiment, the resultant current flow in the relay current coils is inherently cophased with a reduced, yet appreciable, faulted line phase voltage applied to the voltage coil of the related relay. The relay is thereby actuated so as to operate an annunciator or trip coil, depending upon application of the system. In the second-mentioned embodiment, by utilizing the vector sum of the voltages in the non-faulted phases for energization of the voltage coil of each relay, even though the faulted phase line voltage drops to zero, there will still be voltage for relay energization cophased with the attendant current flow in the related coil of the faulted phase relay.

It will thus be seen, in brief, that the novel systems of this invention detect the faulted phase on the basis of summed system voltages compared against faulted phase voltage. In one disclosed embodiment, faulted phase voltage is used directly, whereas in a second disclosed embodiment, the comparison is based on a synthesized or substitute faulted phase voltage.

These and other aspects of the invention will become more fully understood as the description proceeds by reference to the accompanying drawings depicting the two preferred embodiments mentioned.

BRIEF DESCRIPTION OF THE DRAWINGS

FIG. 2 is a conventional balanced three-phase voltage wave diagram; and FIG. 3 is a balanced three-phase voltage vector diagram.

FIG. 4 is a vector diagram showing the drop of the phase A voltage vector attending a phase A-to-ground fault.

FIG. 6 is a voltage vector diagram showing phase A voltage reduced to substantially zero as detected by the fault responder system; and FIG. 7 is a current vector diagram showing resultant current flow in the phase-related relay current coils, and indicating polarizations such that the resultant voltage vector sums of the non-faulted phases cophased with the faulted phase relay current coil current vector.

DETAILED DESCRIPTION REFERENCED TO DRAWINGS

Figure 1:
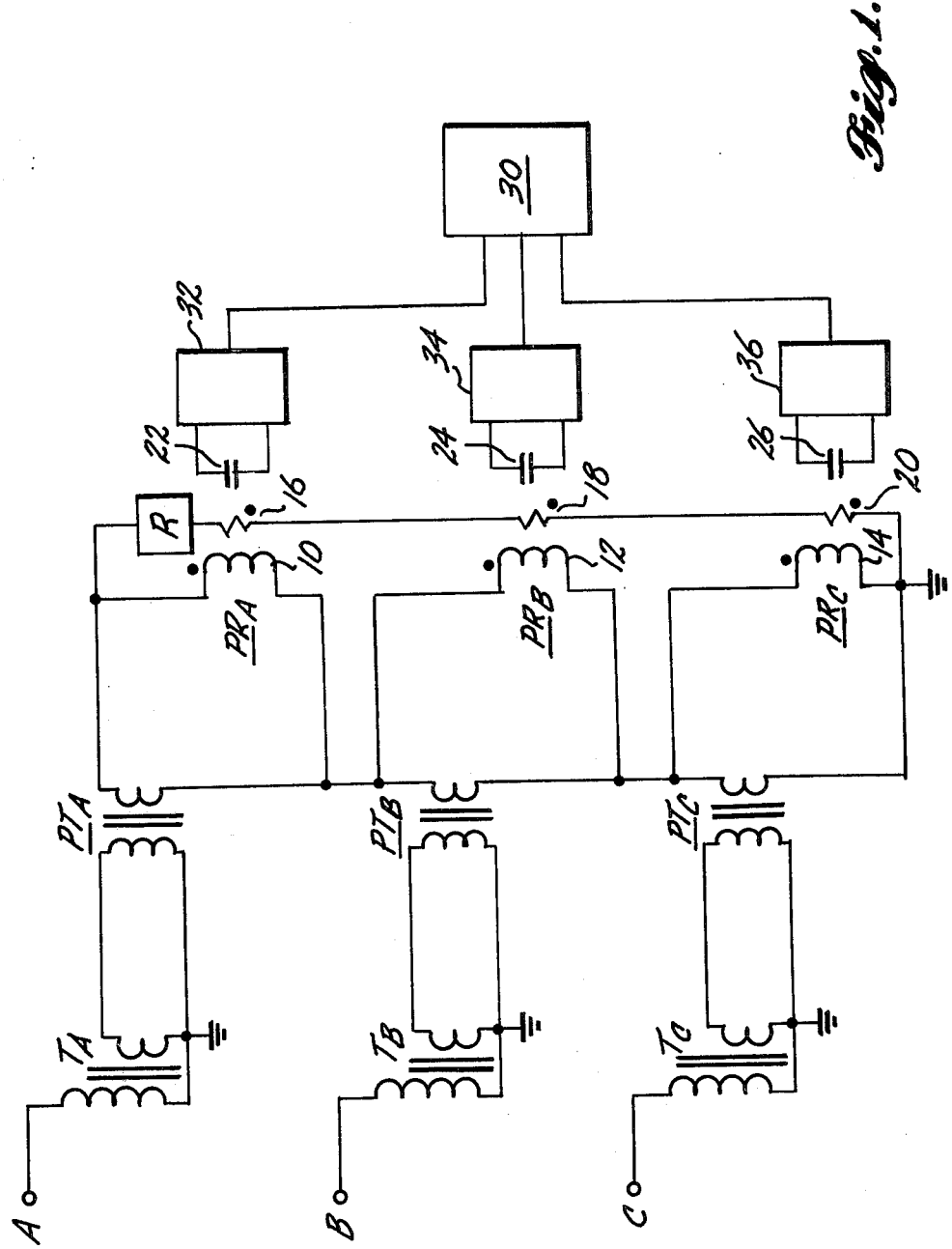
FIG. 1 is a schematic diagram of the first-mentioned embodiment.

In FIG. 1 the respective transmission line phase voltages, such as 230 kv or 161 kv, are applied to the primaries of the respective transformers $T_A$, $T_B$, and $T_C$ to provide distance relay potentials such as 69 volts. These are preferably the same grounded wye—grounded wye potentials that feed distance relays for line relaying in such power systems. At the instrument station, instrument transformers $PT_A$, $PT_B$, and $PT_C$ produce secondary voltages at instrument level, such as 120 volts, across the secondaries of these transformers. Power relays $PR_A$, $PR_B$, and $PR_C$ for the respective line phases have voltage coils 10, 12, and 14 which are connected across the respective secondaries of the instrument or power transformers $PT_A$, $PT_B$, and $PT_C$. The current coils 16, 18, and 20 of the respective power relays may be individually connected (in parallel) across the series of power transformer secondaries with a voltage-dropping resistor in series with each so as to make it, in effect, voltage responsive, but for efficiency reasons are preferably serially connected across the series of power transformer secondaries, with a current dropping resistance R included in the loop. Power relays include respective normally open contactors 22, 24, and 26. The system functions to close the relay contactor associated with the particular transmission line phase upon occurrence of a phase-to-ground fault. For example, relay A contactor closes for an "A" phase-to-ground fault. Depending upon application, the event is utilized either to transmit and record the occurrence of such a fault at a remote supervisory station, identify or select the faulted phase in a single-pole trip and reclose apparatus, or to provide some other suitable form of response. The unit 30 is intended to signify a responder unit of some form or another suitable to the application, and it may constitute, for example, a signal transmission system as well as a means to respond to the transmitted signal.

Because such faults usually last for a very brief interval, such as the duration of three phase cycles, it is preferred to incorporate between the responder unit 30 and the relay contactors 22, 24, and 26, pulse stretchers 32, 34, and 36 which function to provide an output pulse of a second or two in duration despite the brevity of the phase relay contact closure.

FIGS. 2 and 3 illustrate the balanced line voltage conditions that normally prevail in the absence of a ground fault phase condition. Alternating line voltages $E_A$, $E_B$, and $E_C$ are 120° out of phase and are of equal amplitude. This relationship also appears in the vector diagram of FIG. 3. Under these conditions, substantially zero current flows in the series-connected power relay coils 16, 18, and 20. This is true because the sum of voltage components applied in one direction across the series of relay current coils is always equal to and offset by the voltage applied with opposite phase or polarity. In the event of a phase-to-ground, however, the system between a disrupted and, as it turns out, the resultant flow of alternating current in the relay current coils is cophased with the residual, although reduced voltage of the faulted phase. With power relays known as ASEA PE40, the reduced voltage applied to the voltage coils can be as low as 0.6 volt, for example, and still have instrument functionally.

In FIG. 4 the reduced line voltage of A phase $E_{Af}$, in the event of a line-to-ground fault, is shown to indicate the unbalance of voltages. FIG. 7 illustrates the resultant net A phase coil current $I_R$ cophased with the voltage $E_{Af}$ which causes actuation of the associated power relay $PR_A$ in the event of a phase A line-to-ground fault.

Figure 5:
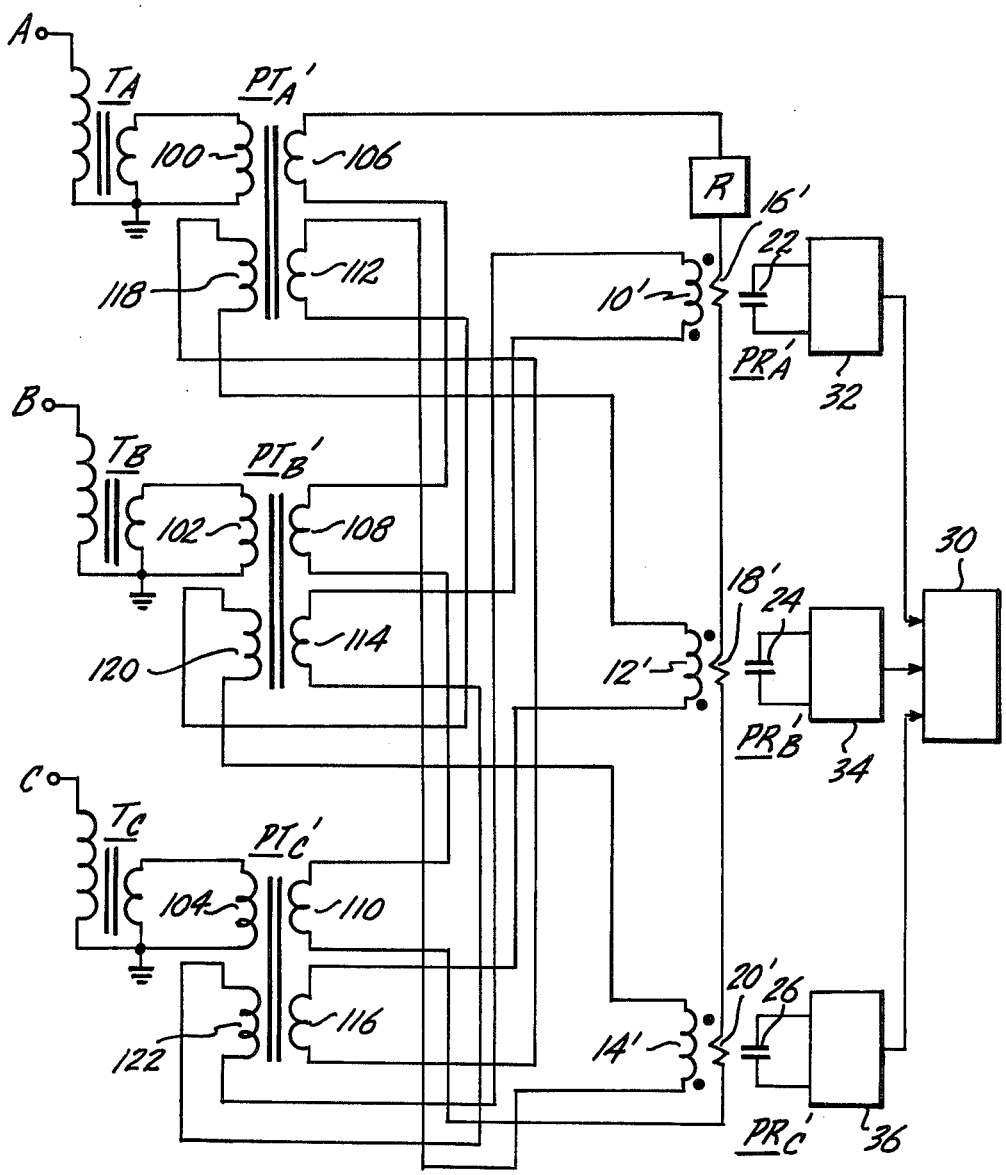
FIG. 5 is a schematic diagram of the second-mentioned embodiment.

Referring to FIG. 5, instrument or power transformers $PT'_A$, $PT'_B$, and $PT'_C$ are four-winding transformers with respective primaries 100, 102, and 104 energized in the same manner as the primaries of the power transformers in FIG. 1. Phase selector relays $PR'_A$, $PR'_B$, $PR'_C$ in this instance are or may be G.E. CCP-type relays and are connected with their respective voltage coils 10', 12', and 14' to be energized by the vector sum of voltages from the other two phases of the system. Thus, if the phase-to-ground fault occurs close to the point in the system in which voltage is tapped for annunciator or other response purposes, the power relay associated with the faulted phase will nevertheless receive energizing voltage for its voltage coil. As will be noted, the respective current coils 16', 18', and 20' for such relays are energized as in the first-described embodiment, namely by serially connecting these coils across the series of secondaries 106, 108, and 110 of the power transformers so as to form a current loop with the relay current coils. In this embodiment, the relative voltage coil-current coil polarizations are opposite from that in the first-described embodiment and for a reason that will now become evident.

As will be noted, power relay voltage coil 10' is connected to be energized by the series-connected secondaries 114 and 122 of respective power transformers $PT'_B$ and $PT'_C$. Voltage coil 12' of power relay $PR'_B$ is connected to be energized by the series-connected secondaries 118 and 116 of power transformers $PT'_A$ and $PT'_C$. Voltage coil 14' of power relay $PR'_C$, in turn, is connected to be energized by series-connected secondaries 120 and 112 of power transformers $PT'_B$ and $PT'_A$. Thus, the voltage coil of each phase-related relay is connected to be energized by secondaries of the power transformers of the other two phases.

As shown in FIG. 6, should phase voltage $E_A$ drop to zero or to a value near zero ($E_{Af}$), it will have virtually no effect on the resultant of the other two voltage vectors, such resultant being designated $E_R$ in FIG. 6. At the same time, the system unbalance current $I_R$ caused by a phase-to-ground fault on phase A results in a net current which, with the polarities of the transformer windings indicated, causes such resultant current to have the effect of an oppositely phased current $I_{R'}$ in essence cophased with the voltage $E_R$ and thus effective to actuate the power relay $PR_{A'}$. Under these conditions a signal, stretched by the pulse stretcher 32, is applied to the responder unit 30 either to annunciate or to otherwise respond to the fault condition.

Accordingly, it will be recognized that the invention provides a reliable, low-cost and inexpensive phase selector system capable of yielding a signal in response to very brief phase-to-ground fault conditions and in doing so consistently, reliably and substantially independently of location of the fault along the transmission line and substantially independently of transient load conditions that might occur simultaneously with the fault. The invention is set forth and defined in the claims that follow with the intent that the illustrated embodiments and also equivalents thereof be included within the coverage of such claims.

The embodiments of the invention in which an exclusive property or privilege is claimed are defined as follows:

1. A three-phase power transmission system phase-to-ground fault responder comprising individual phase-energized elements producing output voltages related to the respective system phase-to-ground voltages and being serially interconnected to produce a net voltage representing the vector sum of such voltages, individual fault-to-ground sensors individual to the respective phases, each such sensor having first and second control elements requiring cophased energization for actuation of that sensor, the first control elements being individually connected for energization by voltage related in amplitude and phase to the respective said system phase-to-ground voltages, the second control elements being connected across the series of serially interconnected phase-energized elements and each sustaining current flow related in phase and amplitude to said net voltage, whereby said sensors remain unactuated with the system three-phase voltages in balance, and whereby occurrence of a phase-to-ground fault of one phase of the system produces substantially cophased energization of the first and second control elements of the sensor associated with that phase for actuating that sensor, and respective phase-associated responder means responsive selectively to actuation of the individual sensors.

2. The fault responder defined in claim 1 wherein the second control elements are serially interconnected and the series thereof is connected across the series of serially interconnected phase-energized elements.

3. The fault responder defined in claims 1 or 2 wherein the individual phase-energized elements are connected to be energized directly and proportionally to the respective said system phase-to-ground voltages.

4. The fault responder defined in claims 1 or 2 wherein the individual phase-energized elements are connected to be energized directly and proportionally to the respective said system phase-to-ground voltages and comprise secondaries of individual respective phase-energized voltage transformers.

5. The fault responder defined in claims 1 or 2 wherein the individual phase-energized elements are connected to be energized directly and proportionally to the respective said system phase-to-ground voltages and comprise secondaries of individual respective phase-energized voltage transformers, and further wherein the individual sensors comprise individual relays, said first and second control elements comprising, respectively, voltage windings and current windings of such relays.

6. The fault responder defined in claim 5 wherein the respective phase-associated responder means include pulse stretchers each operable to produce a relatively prolonged signal in response to a phase-to-ground fault lasting at least approximately three cycles, and means responsive to said pulse stretcher signals.

7. The fault responder defined in claims 1 or 2 wherein the first control elements are connected each to be energized directly and proportionally to the vector sum of voltages proportional to the voltages of the other two phases of the three-phase system.

8. The fault responder defined in claims 1 or 2 wherein the first control elements are connected each to be energized directly and proportionally to the vector sum of voltages proportional to the voltages of the other two phases of the three-phase system.

9. The fault responder defined in claims 1 or 2 wherein the first control elements are connected each to be energized directly and proportionally to the vector sum of voltages proportional to the voltages of the other two phases of the three-phase system, and wherein the individual phase-energized elements are connected in secondaries of individual respective phase-energized voltage transformers, wherein the sensors individual to the respective phases comprise individual relays, and wherein the first control elements comprise respective voltage windings of such relays, each such voltage winding being connected to be energized directly and proportionally to the vector sum of voltages proportional to the voltages of the other two system phases, and wherein the second control elements comprise respective current windings of such relays.

10. The fault responder defined in claim 9 wherein the first control elements are connected each to be energized directly and proportionally to the vector sum of voltages proportional to the voltages of the other two phases of the three-phase system.

11. The fault responder defined in claim 7, including three phase-related transformers each having first, second and additional windings, the first such windings being connected as transformer primaries to be energized proportionally to the respective system phase voltages, the second such windings comprising the respective phase-energized elements, and the additional such windings of each of the three different combinations of two phases being connected to energize the first control element of the remaining phase sensor.

* * * * *

UNITED STATES PATENT AND TRADEMARK OFFICE
CERTIFICATE OF CORRECTION

PATENT NO. : 4,441,135

DATED : April 3, 1984

INVENTOR(S) : Robert E. Drain

It is certified that error appears in the above-identified patent and that said Letters Patent is hereby corrected as shown below:

Column 1, line 51: "accompanying" should be --accompany--

Column 2, line 52: insert --become-- after "phases"

Column 3, line 44: "between" should be --balance--

Column 3, line 44: "a" should be --is--

Column 3, line 50: "functionally" should be --functionality--

Signed and Sealed this

Seventh Day of May 1985

[SEAL]

Attest:

DONALD J. QUIGG

Attesting Officer

Acting Commissioner of Patents and Trademarks